Nov. 13, 1962 E. E. PAUER 3,063,196
PLANT RECEPTACLE HAVING IMPROVED IRRIGATING MEANS
Filed Aug. 15, 1960
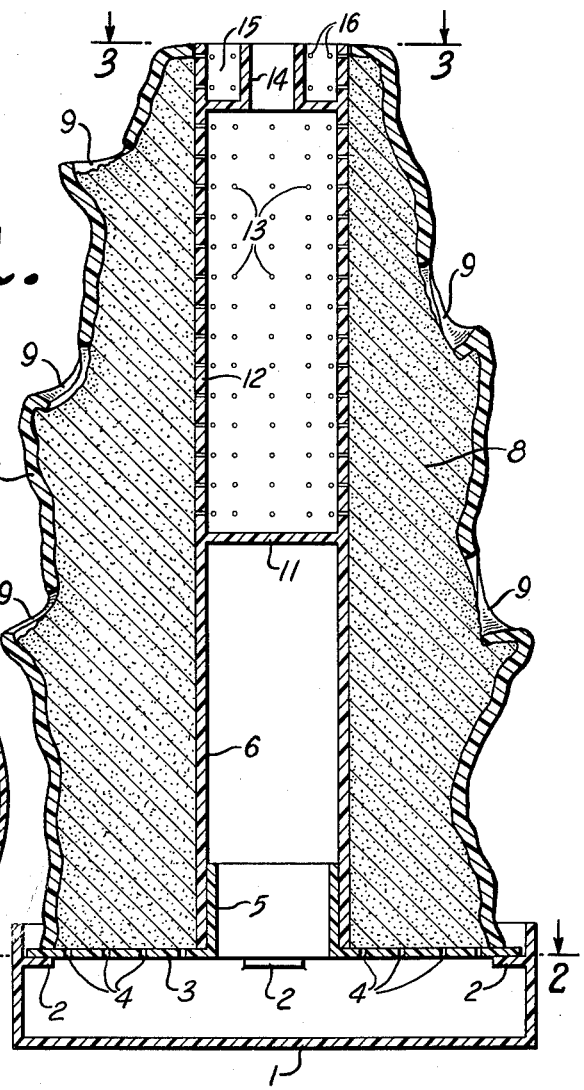
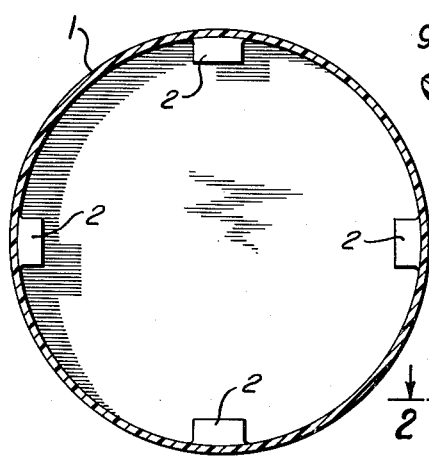
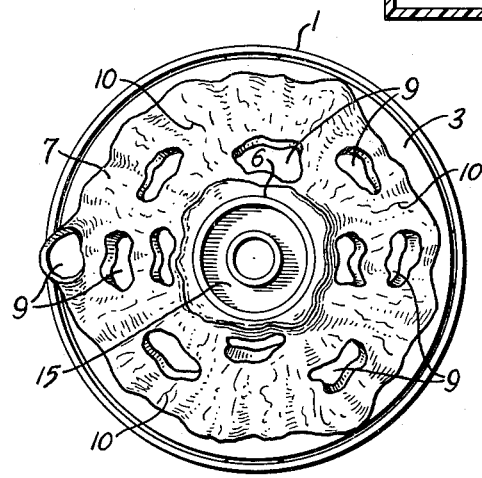
INVENTOR.
Edward E. Pauer
BY
Andrus & Starke
Attorneys

:::::::::::::::::::::::::::::::::::::::::::::::::::::::::::::::::

United States Patent Office 3,063,196
Patented Nov. 13, 1962

3,063,196
PLANT RECEPTACLE HAVING IMPROVED IRRIGATING MEANS
Edward E. Pauer, 2404 Grandview Blvd., Waukesha, Wis.
Filed Aug. 15, 1960, Ser. No. 49,646
3 Claims. (Cl. 47—38)

This invention relates to a planter and more particularly to a planter having improved water distribution and aeration characteristics.

In the usual type of planter, there is a tendency to overwater the plants and therefore, drainage and water control is critical. If the plants are overwatered, the root structures tend to decay with the result that the plants will die, while underwatering will result in poor plant growth. Therefore, it is very difficult to obtain the proper degree of soil moisture in a planter in which there is no adequate provision for drainage.

The present invention is directed to a planter having a structure which provides for a uniform distribution of water throughout the soil. More specifically, the planter includes a base container, and a perforated plate is supported above the bottom of the container. A tube is vertically mounted on the perforated plate and an outer shell is also supported on the plate and spaced radially from the tube to provide a space therebetween which is filled with a column of soil. The shell is provided with openings or pockets into which the plants are inserted.

To provide uniform water distribution, the tube is divided near its midpoint by a divider plate and the upper portion of the tube is perforated. Water is introduced into the upper portion of the tube and drains through the small perforations into the surrounding soil. Any excess water will drain through the soil and be collected in the container.

In order to adequately water the soil at the upper end of the planter, an annular chamber is provided at the upper end of the tube, which is separate from the interior of the tube. Suitable small openings are provided in the chamber which communicate with the upper end of the soil column. This feature insures that the upper end of the soil column, which will generally dry out more quickly than the bottom portion, can be separately watered so as to provide an adequate supply of moisture for this portion of the column of soil.

The present invention provides a uniform water saturation for all portions of the soil column. Due to the fact that the column of soil is supported on the perforated plate, overwatering cannot result because any excess water will drain from the soil and be collected within the base container. In addition, the upper end of the column of the soil is separately watered so that this portion, which will dry out more rapidly, can be adequately saturated at all times.

In addition, the planter enables the root structure to be aerated due to the fact that air will be present within the central tube when the water has drained therefrom. In addition, the outer shell of the planter is provided with a series of hair-line cracks which not only serve as crevices for the roots to cling to, but also increase the aeration of the soil within the planter.

Other objects and advantages will appear in the course of the following description.

The drawings illustrate the best mode presently contemplated of carrying out the invention.

In the drawings:

FIGURE 1 is a vertical section of the planter of the present invention;

FIG. 2 is a transverse section taken along line 2—2 of FIGURE 1; and

FIG. 3 is a top plan view taken along line 3—3 of FIGURE 1.

The drawings illustrate a planter comprising a base container 1 which is provided with a series of inwardly extending ledges 2 which support a generally perforated plate 3. The plate 3 is provided with a series of perforations 4 which are generally in the neighborhood of $\frac{1}{16}$ to $\frac{1}{4}$ inch in diameter with $\frac{1}{8}$ inch being preferred. Normally, the holes are spaced so that there are from 3 to 6 holes per inch with 4 holes per inch being most desirable.

The plate 3 is provided with a central annular upstanding flange 5 and a tube 6 is mounted around the flange and extends upwardly from the plate. An outer casing or shell 7 is also supported on the plate 3 and is spaced radially from the tube 6. A growing medium for the plants, such as soil or a mixture of peat and soil 8, is disposed within the space between the tube and the outer shell 7. As best shown in FIGS. 1 and 3, the shell 7 is provided with a plurality of pockets or openings 9 into which the plants are inserted.

The outer shell 7 may be formed of any suitable material, such as plastic, glass, metal or the like. The contour or shape of the shell can be varied as desired, and as shown in the drawings, the shell has a rough textured outer surface resembling driftwood or the like. However, it is contemplated that the outer surface of the shell may take any desired form and may be either rough or smooth in contour.

The material 8 may be either loose soil or a preformed molded column of a mixture of soil and peat, which consists primarily of peat with a small amount of soil and a binder.

To provide increased aeration for the soil 8 and to provide crevices for the root to cling to, a series of hair-line cracks 10 are formed in the shell. The cracks may take any desired form and generally extend through the shell wall.

To provide uniform water distribution for the soil 8, a divider plate 11 is secured across the tube 6 and closes off the upper end 12 of the tube. Generally, the plate 11 is disposed at a distance of $\frac{1}{2}$ to $\frac{3}{4}$ of the total length of the tube with a location of about $\frac{5}{8}$ of the total length of the tube from the top being most desirable. The upper end 12 of the tube 6 is provided with a series of perforations 13 through which the water contained within the tube flows into contact with the soil 8 which surrounds the tube. The perforations 13 are considerably smaller than the openings 4 in the base plate 2 and are generally in the neighborhood of $\frac{1}{32}$ of an inch, with about four openings employed per square inch of tube surface. Generally, the openings 13 should be in the range of $\frac{1}{64}$ to $\frac{3}{64}$ of an inch in diameter, with 3 to 6 openings per inch being used. This provides the most uniform flow of water from the tube into the soil 8.

In order to provide adequate watering of the upper end of the soil column 8 at the location where it dries out most quickly, a ring 14 is secured to the inner surface of the tube 6 and defines an annular chamber 15. A series of perforations 16 having the same size and spacings as perforations 13 are formed in the tube and provide communication between the chamber 15 and the upper end of the soil column 8. The chamber 15 opens to the atmosphere and is adapted to be filled separately from the tube 6. The water in the chamber 15 will drain through the perforations 16 and saturate or moisten the soil in the upper end of the column. As the soil in the upper end of the column 8 will dry out more quickly, it is contemplated that the chamber 15 will normally be filled more frequently than the tube 6 which serves to water the lower portions of the soil column 8.

In assembly of the planter, the pre-molded column 8 of peat and soil is initially inserted within the outer shell 7 and the tube 6 is then located within the central opening in the soil column. The combined structure is then placed on the base plate 3.

Suitable plants, not shown, are inserted within the pockets 9 and the roots of the plants are positioned within the soil column 8.

Water is introduced into both the tube 6 and the upper chamber 15. Water in the tube 6 will flow through the perforations 13 and downwardly through the column of soil. The excess water will drain through the openings 4 and be collected within the base container 1.

The water contained within the chamber 15 will drain through the perforations 16 and water the upper end of the soil column 8.

The planter of the invention provides a uniform saturation of the entire column of soil with water. Excessive watering is prevented due to the spacing of the bottom of the soil column from the container 1 which enables any excess water to drain from the soil column into the container. Furthermore, the chamber at the upper end of the soil column insures that this portion of the soil column will receive adequate water at all times.

The present invention also provides improved aeration for the soil in that air may pass through the perforations 13 in tube 6 into the soil and also into the bottom of the column of soil through the openings 4. The hairline cracks 10 in the outer surface of the shell also enable air to contact the soil 8.

The present invention is adapted to be fabricated in any desired shape or size. It is particularly adaptable for elongated planters in which the plants are located at various levels throughout the height of the soil column.

Various modes of carrying out the invention are contemplated as being within the scope of the following claims particularly pointing out and distinctly claiming the subject matter which is regarded as the invention.

I claim:

1. A planter having improved aeration and water distribution properties, comprising a base container, a support member mounted above the bottom of the container and having a plurality of holes therein, a column of soil mix supported on said support member and located above the holes therein, an outer casing surrounding said column of soil mix and having a series of pockets providing access to the soil mix for plants, a hollow member disposed internally of said column and spaced inwardly of said casing, said hollow member having an open upper end located at the upper end of the casing and having a plurality of openings providing communication between the interior of the hollow member and the column of soil mix, and a closure member disposed across the hollow member at a level slightly beneath the openings in the hollow member and closing off the lower portion thereof, said closure member being located in the upper ¾ of the height of the casing from the top thereof, water contained within said hollow member passing through the openings and into contact with said soil mix with any excess water passing downwardly through the column and through said holes and being collected in the base container to thereby prevent overwatering of said soil mix.

2. A planter have improved aeration and water distribution properties, comprising a base container, a perforated member disposed above the bottom of the container and supported thereby, a central tubular member supported on the perforated member, an outer shell disposed around the tubular member and spaced outwardly of at least some of the perforations of said perforated member and outwardly of said tubular member to provide a clearance therebetween with said clearance adapted to receive a plant growing medium, the upper end portion of said tubular member being provided with a plurality of openings, a closure member disposed across the tubular member at a level slightly beneath the openings in the tubular member and closing off the lower portion thereof, said closure member being located at a distance of ½ to ¾ of the length of said tubular member from the top thereof, and an annular trough connected to the upper end portion of the tubular member and having a plurality of ports communicating with the plant-growing medium, said trough being adapted to be separately filled with water with the water being adapted to pass through the ports into contact with the upper portion of the plant-growing medium to provide a uniform saturation of water throughout the vertical extent of said medium.

3. A planter having improved aeration and water distribution properties, comprising a base container, a perforated member disposed above the bottom of the container and supported thereby, a central tubular member supported on the perforated member, an outer shell disposed around the tubular member and spaced outwardly of at least some of the perforations of said perforated member and outwardly of said tubular member to provide a clearance therebetween with said clearance adapted to receive a plant-growing medium, the upper end portion of said tubular member being provided with a plurality of openings, and a closure member disposed across the tubular member at a level slightly beneath the openings in the tubular member and closing off the lower portion thereof, said closure member being located at a distance of ½ to ¾ of the length of said tubular member from the top thereof, water contained within the tubular member being adapted to pass through the openings and into contact with the plant-growing medium.

References Cited in the file of this patent

UNITED STATES PATENTS

| | | |
|---|---|---|
| 185,468 | Archer | Dec. 19, 1876 |
| 1,200,396 | Southard | Oct. 3, 1916 |
| 1,635,203 | Brosnick | July 12, 1927 |
| 1,810,236 | Bender | June 16, 1931 |
| 1,993,631 | Smith | Mar. 5, 1935 |
| 2,964,877 | Gauding | Dec. 20, 1960 |

FOREIGN PATENTS

| | | |
|---|---|---|
| 34,653 | Denmark | June 15, 1925 |
| 231,444 | Switzerland | June 16, 1944 |